United States Patent [19]
Andersson

[11] Patent Number: 4,657,614
[45] Date of Patent: Apr. 14, 1987

[54] METHOD FOR MAKING A LAMINATED MATERIAL

[75] Inventor: Thorbjörn Andersson, Södra Sandby, Sweden

[73] Assignee: Tetra Pak International AB, Lund, Sweden

[21] Appl. No.: 720,871

[22] Filed: Apr. 8, 1985

[30] Foreign Application Priority Data

Apr. 16, 1984 [JP] Japan .............................. 59-077008
Nov. 22, 1984 [SE] Sweden ............................... 8405885

[51] Int. Cl.$^4$ .................... B29C 47/06; B32B 31/20
[52] U.S. Cl. .......................... 156/244.11; 156/244.27; 156/321; 156/324; 156/324.4
[58] Field of Search ............... 156/244.11, 244.27, 156/324, 324.4, 321; 428/35, 349, 511, 458, 461, 304.4

[56] References Cited

U.S. PATENT DOCUMENTS

Re. 31,137  2/1983  Ossian et al. .................. 156/244.27
4,407,689  10/1983  Ohtsuki et al. ................. 156/244.27
4,424,256   1/1984  Christensen et al. ........... 156/244.11
4,461,667   7/1984  Pupp .............................. 156/244.11

Primary Examiner—Caleb Weston
Attorney, Agent, or Firm—Burns, Doane, Swecker & Mathis

[57] ABSTRACT

The invention relates to a laminated material which comprises a carrier layer of paper or cardboard and an outside layer of extruded polythene applied to one side of the carrier layer. To the other side of the carrier layer is applied a first binder layer of polythene and a layer of aluminum foil placed against the binder layer. A second binder layer of EAA is provided for the bonding together of the aluminum foil with an inner polythene layer which has been produced by blowing and which has a substantially higher modulus of elasticity and strength than the slot-extruded polythene layer. The invention also relates to a method for the manufacture of the laminate by making use of the heat content of the first slot-extruded binder layer of polythene for heating up the second binder layer of EAA to such a temperature that an effective bonding on the aluminum foil is obtained.

9 Claims, 6 Drawing Figures

METHOD FOR MAKING A LAMINATED MATERIAL

FIELD OF INVENTION

The present invention relates generally to laminated materials suitable for packaging and more particularly to a mechanically strong and heat-sealable laminated material for food packaging which has good oil-resistance properties and is of neutral taste.

BACKGROUND OF THE INVENTION

In packaging technique, laminated material of a complex build-up is used frequently so as to take advantage of the best properties of the different single materials and to combine them to give the optimum combination for the particular kind of package or the particular product which is to be packed. Thus it is known that paper, cardboard or rigid foamed plastic sheet are excellent materials for providing a package with a rigidity such that the material by folding can be formed into packing containers of lasting shape which provide a good mechanical protection for the goods enclosed. However, as is well known paper and cardboard are neither water nor grease resistant nor air-tight, so that the paper material must be combined with other material layers which have these desired qualities.

The laminates produced in this manner can be relatively complex in their build-up owing to a great number of layers being included in the same laminate. Consequently, they are expensive to manufacture, because the laminate has to be built up successively layer by layer. It is also known that plastic material can be coextruded so as to achieve both a better material adhesion and a plastic film containing two or more different plastic layers in a single manufacturing operation.

In the present case, it is desired to build up a packing laminate which has a carrier layer of paper, cardboard or for example polystyrene foam, which implies that packages manufactured from the laminate can be formed by folding to a lasting shape and that a good mechanical protection is imparted to the contents. Moreover, the laminate should be liquid-tight so as not to absorb moisture or liquid which may come into contact with the outside of the package and the package should have an inside which is liquid-tight and which can be heat-sealed by bringing together plastic layers which can be fused together with the help of heat and pressure to a mechanically strong union. Furthermore the inner plastic layer which is in direct contact with the contents should have a low characteristic taste level in cases where the contents are constituted of foodstuffs. The inner plastic film should be sufficiently strong and tough to withstand the stresses on the material occasioned by the fold-forming without causing the plastic material to split. Furthermore, the laminate should include a gas barrier, that is to say a layer which prevents the passage of gas, and as such a layer of aluminum foil can preferably be used. Thus a number of different material layers are to be joined to one another and this is done with the help of different binder layers.

The present invention is further concerned with the manufacturing method of laminated web material possessing a layer of aluminium foil and a layer of thermoplastic synthetic resin material on the inner and external surfaces, respectively, of the substrate. Conventionally, when manufacturing such a laminated web material (laminated paper), broadly speaking, there are used two methods.

The first method is called dry laminating method, in which after applying adhesive to laminated material (subsubstrate) such as a film made from synthetic resin and the like and drying the same, such a subsubstrate is pasted to the surface of the substrate or other laminated material.

Another method, as shown in FIG. 4, is called extrusion laminating method, in which a thin film of synthetic resin material, melted at the temperature as high as 300° C., is injected from an extrusion die and a coated layer of synthetic resin material is formed on the surface of the aluminium foil by the injected synthetic resin material.

What is packaged by the laminated web material which is manufactured by the conventional method gives rise to unreasonably abnormal smell in the content or deteriorates its flavor, such an improper change being more frequently found, whenever it is packaged for longer preservation or at higher temperature.

That is because, for type manufactured by the dry laminating method, for example, there exists a layer of adhesive between the aluminium foil located on the inner surface of a packaging container and a layer of synthetic resin material and said adhesive is eluted.

On the other hand, the extrusion laminating method causes oxidative product (carboxyl group) in the synthetic resin material, by itself, forming a layer of synthetic resin material, the oxidative product is led to outbreak of the abnormal smell and deterioration of the flavor.

Namely, in order to form the packaging container to be filled with a drink, the container by itself is required to have sufficient strength as well as there is such a necessity that the synthetic resin material with which the inner surface of the aluminium foil is laminated is firmly adhered to the aluminium foil so that the container may not be deformed, a leakage of the drink to be packaged being prevented. In order to adhere firmly the synthetic resin material to the aluminium foil, however, in the case of polyethylene resin, for example, the synthetic resin material needs to be injected at a high temperature over 300° C. The synthetic resin material which is injected at the high temperature sticks closely to the surface of the aluminium foil and gets in contact with the air for relatively longer time before forming a thin coated layer thereon, resulting in a great number of oxidative product. Conversely, if the synthetic resin material is maintained at a lower temperature so as to prevent the outbreak of the oxidative product, the adherence with the aluminum foil becomes weaker and the workability of the container becomes worse.

The oxidative product existing in the layer of synthetic resin material is gradually eluted into the goods to be packaged particularly in the situation of higher temperatures, wherein the degree of elution is increased.

For this reason, a package using the laminated web material manufactured by the conventional method cannot be readily heated so as to preserve food sensitive to taste and flavor for a long time.

OBJECTS AND SUMMARY OF THE INVENTION

The present invention, which is created in light of the foregoing concerns has as an object to provide a laminate material having a synthetic resin film firmly adhered to the surface of a layer of aluminium foil.

Another object of the present invention is to provide a method of manufacturing a laminated web material for packaging food which reduces the outbreak of oxidative product to an extreme extent.

The present invention provides a rational method for the manufacture of such a material wherein a film of melted synthetic resin material is injected between a substrate web and an aluminum foil web while a web of blown synthetic resin film is positioned at the opposite side of the aluminum foil. These materials are then passed between a pair of rollers, whereby the melted synthetic resin material bonds the aluminum foil web to the substrate web and the synthetic resin film is sealed to a surface of the aluminum foil web by the heat conducted from the synthetic resin material through the aluminum foil web.

A BRIEF DESCRIPTION OF THE DRAWING

Preferred embodiments of the present invention will be described with reference to the enclosed schematic drawing, wherein.

Figure 1:
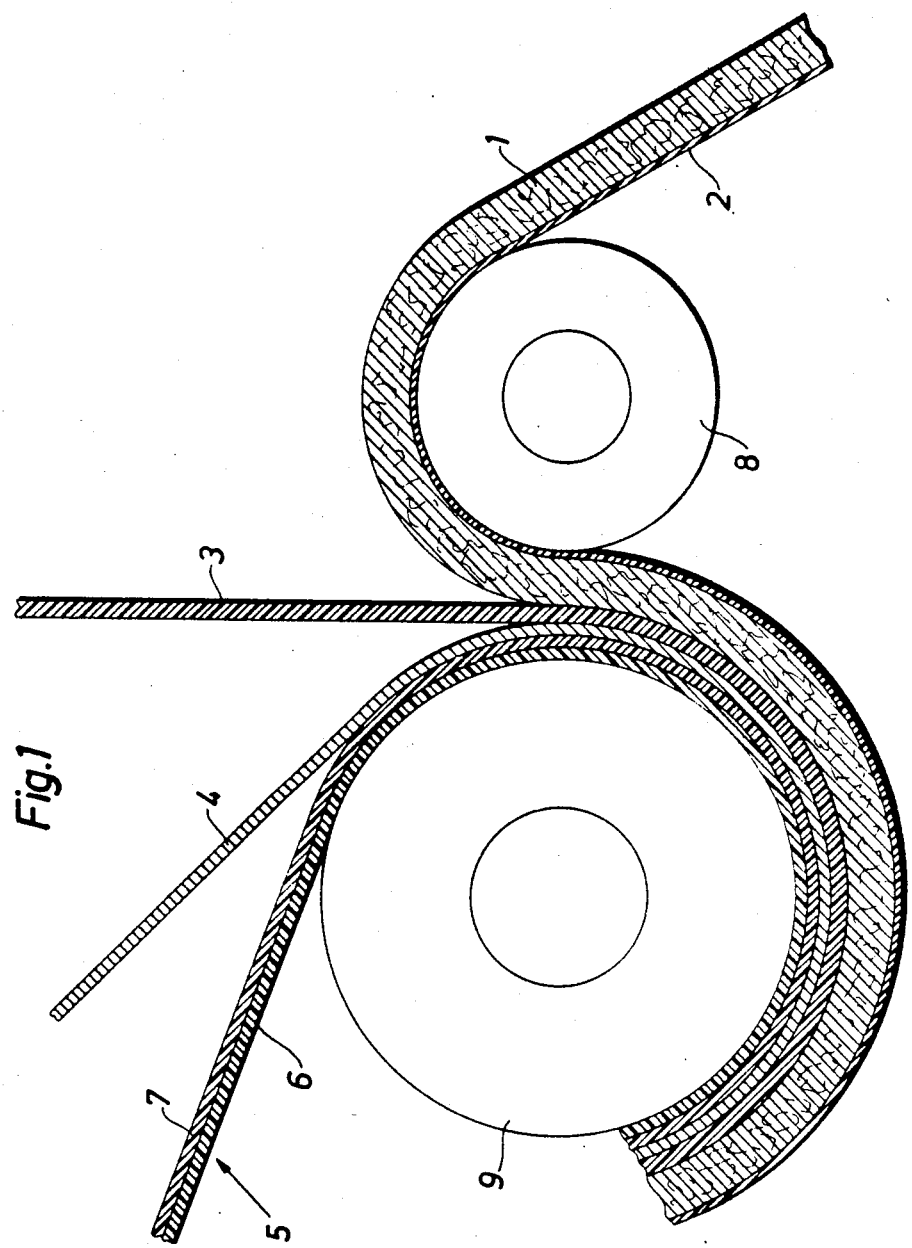
FIG. 1 is a detail view of the different material layers comprising a preferred embodiment of the present invention being joined to one another.

The laminate in accordance with the invention may consist of several different material combinations, and in the following a material combination suitable for the manufacture of packages for liquid foodstuffs is indicated. The build-up of a laminate in accordance with the invention is evident from FIG. 1 which shows how a carrier layer 1 of paper or cardboard, coated beforehand with a polythene layer 2 is passed over a cylinder 8 and down into the so-called "nip" between the cooperating pressure and cooling cylinders 9 and 8. An aluminium foil web 4 whose width substantially corresponds to the web 1 is also guided in between the said cylinders. Also introduced between the aluminium foil web 4 and the carrier layer 1 is a slot-extruded plastic film which is manufactured in such a manner that plastic material is melted and pressed out through a die with a linear slot (slot extrusion). The warm plastic film 3, not yet solidified, is then compressed with the help of the cylinders 8 and 9 between the carrier layer 1 and one side of the aluminium foil 4, a mechanical bond ensuing between the plastic material 3 and the carrier layer 1 and between the plastic material 3 and the aluminium foil 4, at the same time as the plastic film 3 cools down and becomes stabilized. In the case considered here, however, a coextruded film 5 manufactured beforehand comprising two plastic layers, namely a plastic layer 7 of the EAA type (usually described by its English name ethylene acrylic acid) and a plastic layer 6 consisting of blown polythene is also introduced between the cylinders 9 and 8. As the plastic layers 6 and 7 are coextruded they have good adhesion to each other. A problem arises in creating good adhesion also between the outer blown plastic layer 6 and the aluminium foil 4 in one and the same laminating operation. In the case described here the aluminium foil layer 4 is bonded to the carrier layer 1 with the help of the slot-extruded plastic film 3 and in this lamination the bulk of the heat content in the extruded plastic film 3 is given off to the aluminium foil 4 since aluminium foil is a much better heat-conducting material than the paper material in the carrier layer 1. At the same time as the plastic film 3 cools down and is stabilized the aluminium foil layer 4 is thus heated and the heat from the plastic layer 3 is transferred to the EAA layer 7 of the coextruded plastic film 5 which has a sealing temperature of approximately 93° C. Since the extruded plastic film has to be heated to at least 300° C. to allow it to be extruded it has a relatively large heat content which has to be dissipated. If the temperature and the thickness of the extruded plastic layer 3 are chosen correctly, sufficient heat for the achievement of a seal will be transferred to the EAA layer 7 which is raised thereby to a temperature exceeding 93° C. and is make to melt therefore along its surface facing the aluminium foil layer 4 and after cooling is bonded to the aluminium foil layer 4. In one and the same lamination operation the whole laminate combination has thus been produced with the exception of the carrier web 1 having been coated beforehand with plastic in a special process and the film 5 having been manufactured through coextrusion and blowing in a separate process. Great economic advantages can be obtained by rationalizing in this manner the laminate manufacture in that the extrusion of two separate lamination layers is avoided by utilizing the heat from the only extruded lamination layer 3 for heating the surface layer 7 of the coextruded film to a sealing temperature.

The normal method for manufacturing a laminate consists in carrying out the plastic coating of the aluminium foil layer 4, that is to say the inside layer of the laminate as a separate slot-extrusion. It has been found, however, that polythene has to be extruded at minimum 300° C. if a good adhesion on the aluminium foil is to be achieved and that at this temperature the material will be polar-oxidized, which means that it cannot be heat-sealed if it is in contact with liquid or if the material is moistened in any way.

Modern packaging methods involve sealing through a liquid column so that a polar material on the inside of the package can not be used for such seals. This problem has been solved by extruding a further polythene layer at a lower temperature outside the polythene layer which has been extruded at high temperature and if this extrusion is carried out at a temperature remaining below 290° C. the outermost polythene layer will not be polar but can be heat-sealed in the presence of liquid.

There are appreciable differences in the mechanical characteristics, however, between a polythene layer which has been slot-extruded by causing the plastic material to melt and pressing it out through a slot-shaped die, and a polythene layer which has been manufactured as a so-called blown film (that is to say the polythene material after melting is pressed out through an annular die to form a tubing which is inflated with the help of a compressed gas so that the diameter of the tubing is substantially enlarged). The differences in the manufacturing process involve among other things that the plastic in the blowing process can be extruded at a temperature of 140°–180° C. whereas in the corresponding slot-extrusion temperature is approximately 250°–325° C. Through the subsequent blowing of the tubing an orientation effect is achieved on the plastic material which is thus molecular-oriented and so acquires substantially improved mechanical strength characteristics. The modulus of elasticity among other things is doubled in principle, which is approximately 200 MPa for a blown polythene film while the corresponding modulus of elasticity for a slot-extruded polythene film is approximately 100 MPa. Moreover the rupture strength of the blown film is substantially higher in longitudinal as well as in transverse direction of the film (the blown film has strength values which are approximately 15–30% better). Another very considerable advantage is that the blown film gives off appreciably less taste which is of particular importance in the packaging of foodstuffs.

The sealing characteristics of the blown film are exceptional. Especially for packages of warm products or products which are to be heated in their package, e.g. beverages, it has been found that blown polythene film exercises a substantially smaller taste effect upon the product than slot-extruded polythene film.

A packing laminate with inside layer of blown polythene film thus offers considerable advantages over the slot-extruded polythene coating used up to now. These advantages are most pronounced in the packaging of taste-sensitive foodstuffs and especially those foodstuffs which are intended to be heated inside their package. This is the case, for example, in vending machines of certain non-returnable packages for beverages of the type of coffee or tea where the package is delivered by the machine with heated contents. As has been pointed out the mechanical properties of a blown polythene film are also substantially superior to the corresponding properties of a slot-extruded polythene film. This advantage can be made use of in particular in those packages which are manufactured from a tube which has been formed from a planar web of packing laminate. In packages of the said type, which are converted to parallelepipedic containers, a relatively comprehensive folding processing is required in the course of which triangular, doublewalled lugs are formed at the corner points of the package which are folded in against the package body and are sealed to the same. In this folding process "double foldings" occur at a great number of points where several layers of plastic material are involved. Consequently, the plastic layers are subject to appreciable stretching and tensile stresses. Such stresses often may cause inside layers of the package to split or in any case be damaged so that small leakages are produced as a result of which the contents of the package in liquid form may penetrate through the inner plastic layer and possibly cause delamination of the layers making up the laminate, or may be absorbed by the fibrous paper portion of the carrier which would then become wet and completely lose its mechanical strength. In so-called aseptic packages, where the contents consist of a sterile liquid, such a leakage causes infection of the contents whose sterility is then lost. This problem of split or damaged plastic layers at the points of folding can be practically eliminated if a blown polythene film is used as an inside layer, because the blown polythene film has better tensile strength and expansion properties than a slot-extruded film. Also, its modulus of elasticity is twice as high. The high modulus of elasticity also means that the inside layer can sustain mechanical shocks better, e.g. when a package is dropped.

It can be said, therefore, that a laminate of the type which is manufactured according to FIG. 1 has great advantages, but its blown polythene film has to be produced in a separate operational phase.

Figure 2:
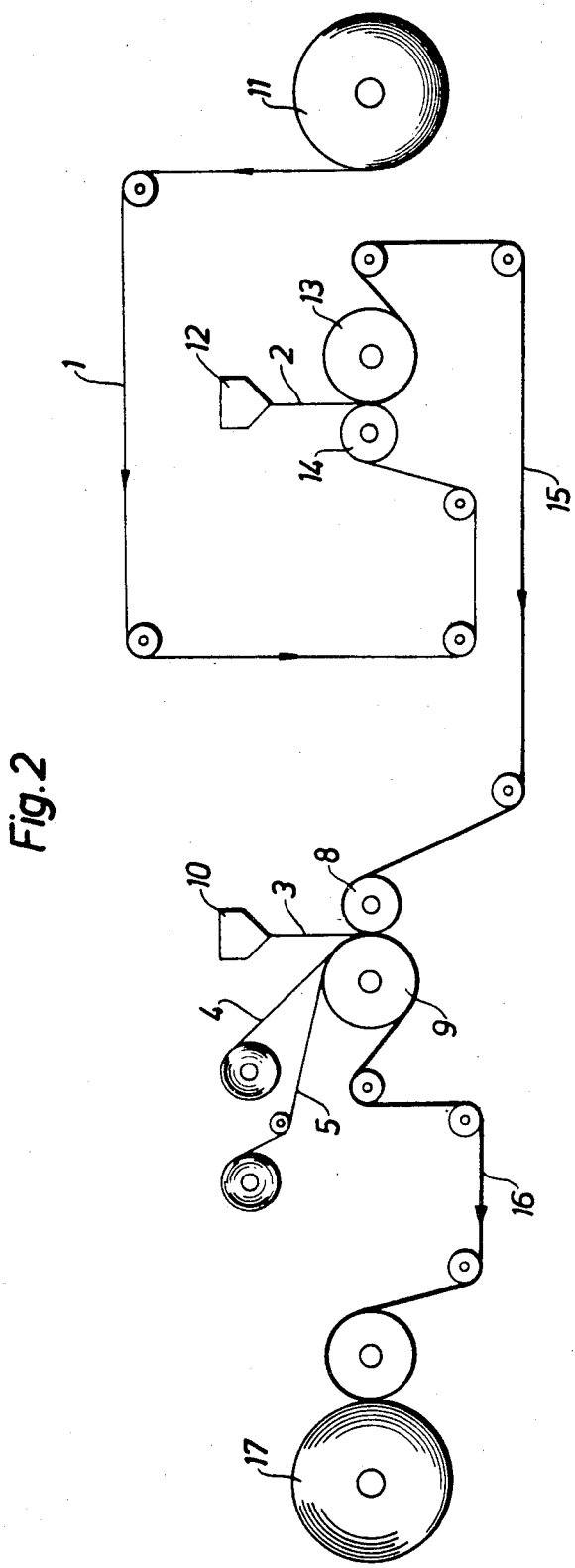
FIG. 2 is a schematic view of the manufacturing process according to a preferred embodiment of the present invention.

To make it possible to manufacture the laminate in such a manner that it is not substantially more expensive than laminate with slot-extruded plastic layers used at present, a rational coating process is required and such a process is described with reference to FIG. 2 where a magazine roll of carrier material consisting of paper, cardboard or polystyrene foam is designated 11. A web 1 of carrier material is reeled off the magazine roll 1 and is passed over guide rollers to a coating station where the web 1 is introduced into the so-called "nip" between pressure cylinders 14 and 13, the cylinder 13 being cooled. A molten plastic film 2 of polythene is extruded with the help of the extruder 12 through a slotlike die and is applied to the web 1 over its whole width. This polythene film 2 is extruded at a relatively high temperature (approx. 300° C.) so that good adhesion should be obtained on the paper web 1 and since the plastic film 2 is to consitute the outside coating of the packing laminate, and thus only act as an outer moisture protection, the coating can be a relatively thin one of 5–20 g/m, for example. The molten plastic film 2 is stabilized through cooling with the help of the cooling cylinder 13, and the resulting laminate forms a web 15 comprising the carrier layer 1 with its outer coating 2 of polythene film. The web 15 is conducted to a second coating station where the web 15 is introduced between the pressure and cooling cylinders 8 and 9 together with a slot-extruded plastic film 3 which is pressed out from the extruder 10. Into the nip between the cylinders 8 and 9 is also introduced an aluminium foil 4 and a blown film, coextruded beforehand in a manner which will be described later, comprising an outer layer of polythene and an inner layer of EAA (ethylene acrylic acid). The molten plastic film 3 pressed out from the extruder 10 is intended to constitute the lamination layer or binder layer between the aluminium foil 4 and the non-coated side of the web 15. When the web 15 and the aluminium foil 4 are pressed together with the help of the cylinders 8 and 9 and take up between them the molten polythene layer 3, the aluminium foil layer 4 will be effectively bonded to the carrier layer 1 of the web 15. The plastic layer 3 will be cooled down with the help of the cooling cylinder 9 and the heat discharged from the plastic film 3 will pass at the same time through the aluminium foil layer 4. The aluminum foil layer 4 becomes heated and by heat conduction transfers thermal energy to the EAA layer of the blown film 5. The EAA layer, which has a sealing temperature as low as approx. 93° C., will be heated to a softened condition and becomes bonded to the aluminium foil layer 4 when the two webs are pressed together between the cylinders 8 and 9. The thermal energy will be discharged thereafter to the cooling cylinder without the outer polythene layer of the film being heated appreciably, since the polythene layer of the blown film 5 is placed in direct contact with the surface of the cooling cylinder.

In the manner which has been described above, the web 15, the aluminium foil 4 and the coextruded blown film 5 are laminated in one and the operation with the help of the slot-extruded polythene film 3. The finished laminate 16 subsequently is rolled up on a magazine roll 17.

Figure 3:
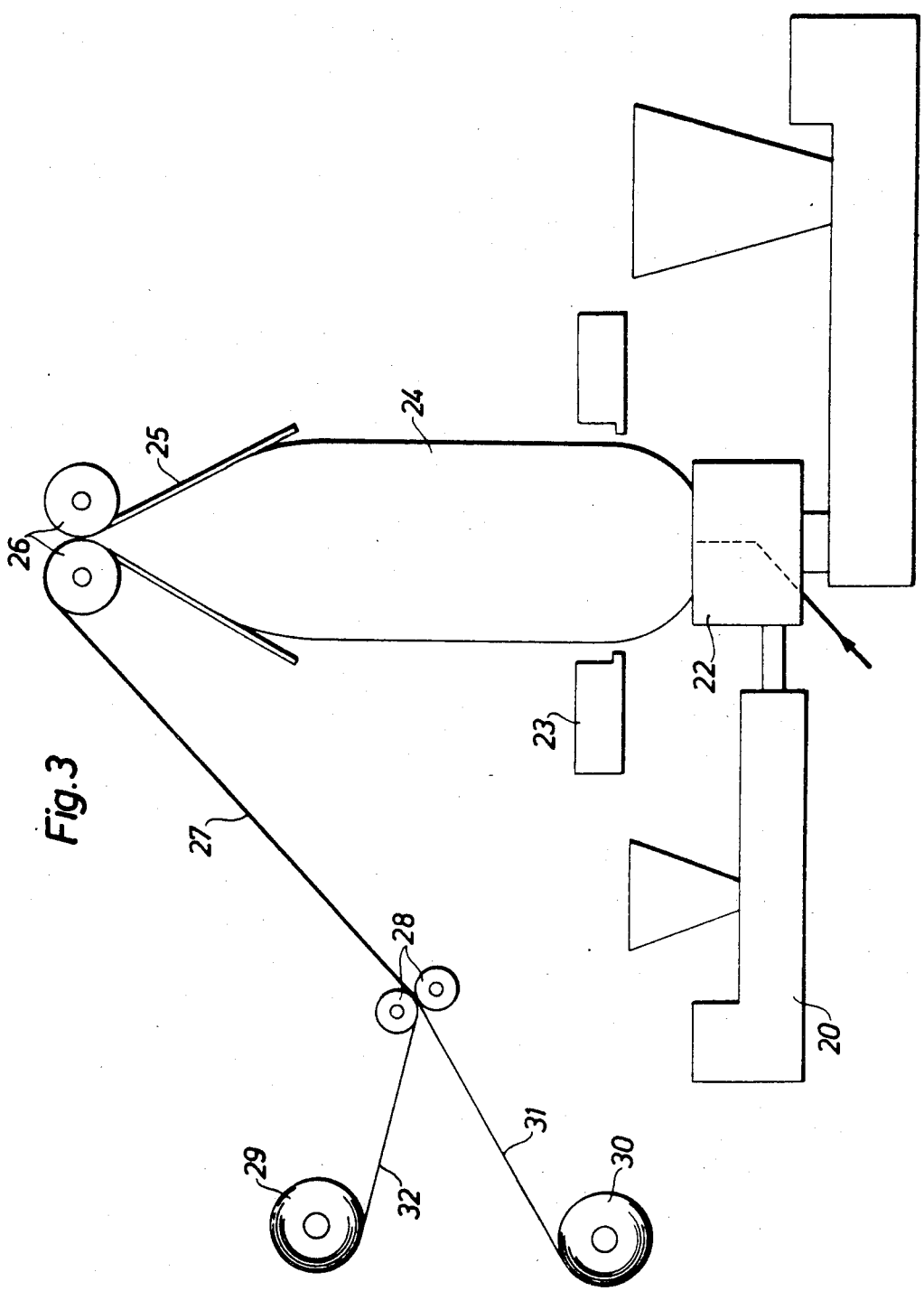
FIG. 3 is a schematic view of an arrangement for producing a blown film comprising polythene and EAA, which film is utilized in the process of FIG. 2.

As mentioned earlier a blown coextruded plastic film manufactured beforehand comprising a layer of polythene and a layer of EAA is required for the production of the laminate 16. This film is manufactured in the manner as shown in FIG. 3 wherein two so-called extruders 20 and 21 are both coupled to a coextrusion die 22. To the extruder 20 is fed EAA in the form of granules or powder and the plastic material is melted in the extruder with the help of heat while it is extruded at the same time by means of one or more screws so that a high pressure is imparted to the molten plastic mass. The same occurs in the extruder 21 where polythene is melted and pressed under high pressure against the extruder die 22. In the extruder die 22 the two molten plastic materials are conducted into separate annular channels, essentially parallel with one another, later to be joined together again at, or in the proximity of, the annular opening of the die 22, as a result of which the two plastic materials form an extruded seamless tubing 24 one side of which presents an EAA layer whereas the other side presents a polythene layer. By means of compressed air supplied to the extruder die 22 the tubing 24 formed is inflated in such a manner that its diameter is substantially increased. To stabilize the tubing and check the diameter cold air is blown against the outside and/or inside of the tubing, e.g. with the help of an annular cooling arrangement 23. The plastic material which has been, thinned out through expansion by the blowing process and given a certain molecular orientation is cooled so as to become stabilized. The tubing 24, while filled with compressed gas, is passed upwardly toward two co-operating pressure rollers 26 between which the tubing is flattened. The flattening does not take place before the inside layer of EAA has been stabilized or cooled down to such an extent that the temperature is well below the sealing temperature of the material, otherwise the inside of the tubing would be sealed together during the flattening. The tubing 24 and its inside layer of EAA are cooled down, however, at the same time as the tubing 24 is conducted upwardly and is introduced between converging guide plates 25 towards the co-operating rollers 26. The flattened tubing 24 is designated 27 and is passed from the flattening rollers towards the cutting device 28 where cutting discs cut off the edge portions of the flattened tubing to form two separate webs 31 and 32 which are rolled up on magazine rolls 30 and 29 respectively. The webs 31 and 32 thus consist of a blown coextruded plastic films, one side of which is consistuted of polythene and the other side of which is consistuted of EAA. This coextruded film is used for producing the laminate and is designated 5 in FIG. 2. It is possible within the scope of the concept of the invention to use material combinations other than those mentioned above. For example a carrier layer of rigid foamed plastic, e.g. polystyrene foam, can be used instead of paper or cardboard. The outer plastic layer of the laminate, as well as the inner blown plastic layer, instead of being consistuted of polythene, may consist of some other polyolefin, e.g. polypropene which is coextruded with EAA or Surlyn, and the extruded first binder layer instead of polythene may be consistuted of e.g. combinations of LDPE (low density polyethylene) of LLDPE (linear low density polyethylene), EAA, Surlyn and LDPE or Surlyn and LDPE or Surlyn alone. The thermoplastic material used for forming the second binder layer may be described as a bonding plastics, the most important representatives of which are carboxylic acid copolymers or partly neutralized carboxylic acid copolymers. Of these EAA today is the most commonly used polymer.

The description of the formation and action of a second preferred embodiment of the present invention will now be made with reference to FIGS. 4, 5 and 6.

Figure 6:
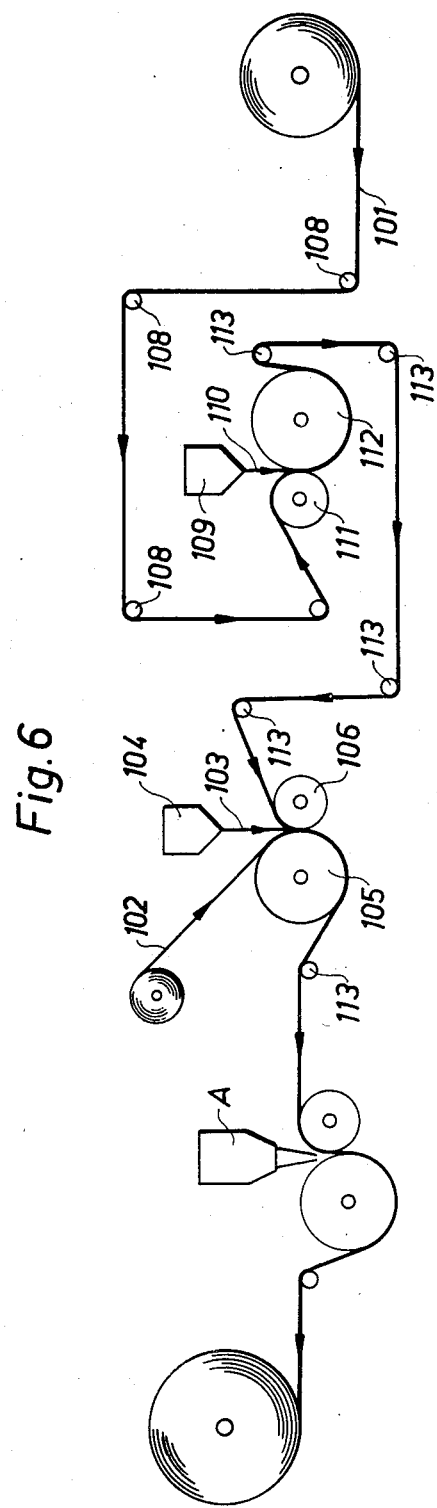
FIG. 6 is a schematic view of the manufacturing process performed by a conventional manufacturing method.

Conventionally, as shown in FIG. 6, in order to combine the substrate 101 with the aluminium foil 102 as one unit, the method in which the melted synthetic resin material 103 is injected from the die 104 so that said substrate 101 and said aluminium foil 102 are pressurized to be interposed by a pair of rollers 105 and 106 so that they may be adhered to each other has been conducted. In that case, even if the synthetic resin material, which is activated at high temperature, contains a great amount of oxidative product, because it is apart from the content to be packaged by the aluminium foil, there may be no apprehension of eluting the oxidative product into the content to be packaged.

From that view, the present invention employs such an arrangement in which at the same time of injecting the thin film of melted synthetic resin material 103 between the substrate 101 and the aluminium foil 102, the thermoplastic synthetic resin film 107, which is separately made, is supplied to the inner surface of the aluminium foil 102 (the surface of the aluminium foil being adhered to the substrate) so that the substrate 101, the melted synthetic resin material 103, the aluminium foil 102, and the synthetic resin film 107 are pressurized to be interposed by a pair of rollers 105 and 106, whereby said melted synthetic resin material bonds the aluminium foil to the substrate and, at the same time, the synthetic resin film is deposited to the inner surface of the aluminium foil by the heat of said melted synthetic resin material.

One of advantages of the laminated web material lies in the probability of using the paper, employed as a substrate, on the surface of which an optional printing may be performed. In that case, it is general that the surface to be printed, i.e. the external surface of the substrate is coated with the synthetic resin material.

Figure 4:
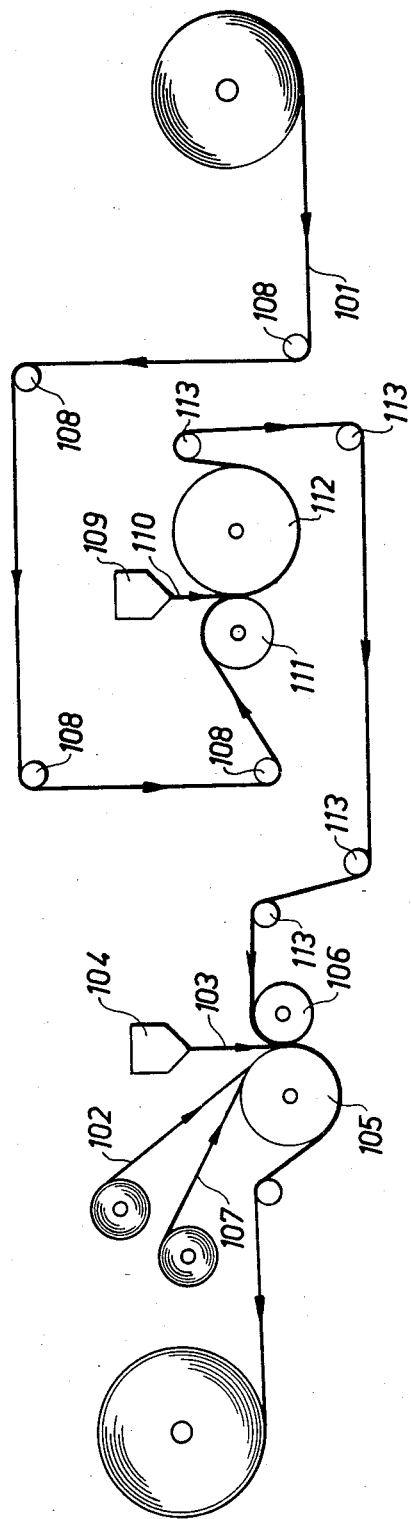
FIG. 4 is a schematic view illustrating the manufacturing process of the laminated web material which includes the method of the present invention.
Figure 5:
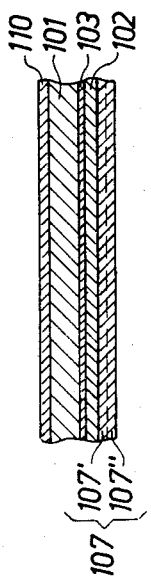
FIG. 5 is a sectional view of the laminated web material for packaging the food produced by the process of FIG. 4.

The following discussion of the embodiment illustrated in FIG. 4 explains process of applying the coating to the external surface of the substrate 101 and treating the inner surface thereof.

A roll of wound substrate 101 is continuously fed out by a guide roller 108 and as in the first process, the melted synthetic resin material 110 is injected from the die 109 to the external surface of the substrate so that they are applied to each other by a pair of rollers 111 and 112, thereby forming a layer of synthetic resin material 110 on the external surface of the substrate 101.

The resultant substrate 101 is continuously supplied to the following process of laminating the inner surface thereof.

When the substrate 101 is supplied to a pair of rollers 105 and 106, while being wound around the guide rollers 113, the aluminium foil 102 is supplied on the substrate 101 in such a way that they put each over other, while the synthetic resin film 107 is also supplied on the aluminium foil 102, and, at the same time, the melted synthetic resin material 103 is injected from the die 104 to the part between the substrate 101 and the aluminium foil 102.

As the synthetic resin material 103, the polyethylene which is melted, for example, at over 300° C. fitted to the deposition of the aluminium foil to the substrate is employed.

Thus, when the synthetic resin material of high temperature is injected between the aluminium foil 102 and the substrate 101, its heat is conducted through the aluminium foil at once and is transferred to the external surface of the aluminium foil, namely the synthetic resin film 107 serving as the internal surface of container, whereby the temperature of the surface of said synthetic resin film 107 is increased for a moment so that its surface is softened. After that, they are pressurized to be interposed by the rollers 105 and 106, so the substrate 101, the aluminium foil 102, and the synthetic film 107 are firmly adhered one to another, thereby finishing the web material possessing such a laminated structure as shown in FIG. 5 so that its roll is wound on and on.

The pair of rollers 105 and 106 is called a nip roller. The roller 105 is preferably made of metal and functions as a cooling roller, while the other roller 106 is preferably made of rubber and functions as an applying roller. Because of this arrangement, the time taken for pressurizing the substrate 101, the melted synthetic resin material 103, the aluminium foil 102, and the synthetic resin film 107 to be interposed by the rollers is extremely short, during the period of which the synthetic resin film is deposited to the surface of the aluminium foil and at the next moment the synthetic resin film is cooled by the roller 105, so no occasion of giving rise to a great number of oxidative product within itself takes place before its temperature becomes lower.

The method of depositing the synthetic resin film in accordance with the present invention can reduce the outbreak of the oxidative product to extreme extent for the following reason, as compared with the conventional method of injecting the melted synthetic resin material on the surface of the aluminium foil which is pasted to the substrate in advance.

Namely, the state of high temperature needed for depositing the synthetic resin material to the surface of the aluminium foil is as short as a moment and in contrast with the conventional method in which the temperature of the surface of the aluminium foil is lower, the effective temperature required for the deposition getting lower than the temperature of the synthetic resin material by itself, the effective temperature according to the present invention becomes higher.

In other words, although the conventional extrusion laminating method has a necessity of increasing the temperature of the synthetic resin material as highly as possible, the present invention produces the same effect that the depositing process is executed at higher temperature than the temperature of the surface of the synthetic resin film which is actually heated, thereby realizing as firm deposition as possible.

As the synthetic resin film supplied to the surface of the aluminium foil, a blown film is used which blown film is molded at the lower temperature so as to avoid the production of oxidative product. The blown film is also subject in its quality to the user's option, depending upon the application mode including the kind of the food to be packaged. In that case, the quality of the synthetic resin film may preferably have its temperature at which it is heated by the synthetic resin material of high temperature being injected between the aluminium foil and the substrate reached the softening temperature fitted to the deposition.

There is available for use the blown film which injects over two kinds of synthetic resin materials from one die, employing the multilayer structure. If such a film is used and, for example, as shown in FIG. 5, its combination with optional synthetic resin material such as polyethylene of lower density 107' for the surface facing the aluminium foil and polyethylene of higher density 107" for the surface facing the food is performed, the resultant quality getting more superior in terms of both the factors such as the depositing strength to be substrate and the preservation of the food, the laminated web material for packaging of higher quality may be obtained.

Although the foregoing embodiment tentatively puts a focus upon the laminated web material as the substrate of which so-called laminated paper is used, such a variation that as the substrate by itself, the synthetic resin material, for example polyethylene web material or expandable synthetic resin material, is optionally used may be put in practical use.

According to the manufacturing method of web material for packaging the food of the present invention, there is no worry that the layer of synthetic resin material laminated to the inner surface of the aluminium foil is eluted through the synthetic resin film, because the layer of such an adhesive as conventionally needed under the dry laminating method does not exist. Furthermore, because the layer of synthetic resin material facing the food is not exposed to high temperature for a long time, there is extremely little opportunity for the formation of an oxidative product.

For this reason, although packaging web manufactured by the conventional method causes the influence from the oxidative product in the adhesive and the synthetic resin material to change the taste and the flavor of the contents of the package, the web material which is manufactured by the method according to the present invention can reduce the influence of the container upon the food to the limit. In other words, it does not change the quality of the food, can maintain better preservation state of the food as long as possible, and, at the same time, it is extremely effective in packaging the food sensitive to a slight change in smell and taste, for example, liquor and various kinds of table luxuries.

As the temperature of the oxidative product becomes, higher the change in taste and flavor caused by the oxidative product becomes greater. For this reason, although it is in all respects impossible that this kind of laminated web material manufactured by the conventional method packages and heats for example milk and coffee for marketing them, what is packaged by the web material manufactured by the method of the present invention does not cause the taste and flavor to be changed, even if it is heated, and is durable enough to be marketed, thereby producing the effect of satisfactorily meeting various needs for sales mode.

Furthermore, according to the method of the present invention, because the aluminium foil and the synthetic resin film, which are not being changed in their quality, are more firmly deposited to each other than the conventional method, there is obtained a stretchability high enough to withstanding the bending made during the packaging of the food. Accordingly, no cracks take place around bent points in the package, resulting in reinforcing the strength of the package itself so that there is reduced such a possibility as the package is deformed or damaged in transit.

The further characteristics of the method according to the present invention simplifies the manufacturing facilities, thereby reducing the manufacturing cost. Namely, the method of the present invention, when coating the surface of the aluminium foil with the synthetic resin material, does not need a new thermal source and injection device which are needed in the case of the conventional extrusion laminating method and is not required to install the applying and drying process of the adhesive which is needed in the case of the dry laminating method utilizing effectively the heat of the synthetic resin material which is melted at higher temperature, being injected between the aluminium foil and the substrate so that the synthetic resin film may be deposited to the surface of the aluminium foil.

Through application of the invention it is possible to manufacture in a rational and inexpensive manner a laminate with properties which in many cases are superior to the properties of the laminates produced up to now in that the inside of the laminate can be constituted of a blown polythene film instead of a slot-extruded film.

It is to be understood that the present invention may be embodied in other specific forms without departing from the spirit or essential characteristices of the present invention. The preferred embodiments are therefore to be considered illustrative and not restrictive. The scope of the invention is indicated by the appended claims rather than by the foregoing descriptions and all changes or variations which fall within the meaning and range of the claims are intended to be embraced therein.

What is claimed is:

1. A method of forming a packing web, comprising the steps of:
    providing a first laminate including a thermoplastic film and a first binder layer, said first binder layer having a softening temperature;
    providing a second laminate including a carrier layer;
    interposing a layer of metallic foil between said first binder layer and said carrier layer while extruding a second binder layer of thermoplastic material in a heated condition between said layer of aluminum foil and said carrier layer to form an intermediate web;
    bonding said first and second laminates with said layer of metallic foil by compressing said intermediate web while conducting heat from said second binder layer to said first binder layer through said metallic foil to raise said first binder layer to at least said softening temperature.

2. The method as claimed in claim 1, wherein said thermoplastic film includes a blown layer of blown polyethylene material coextruded with said first binder layer, said blown layer being located at an exterior region of said intermediate web, said compressing step including the step of contacting said blown layer with a pressing roller, whereby said blown layer is cooled.

3. The method as claimed in claim 2, wherein said second laminate includes a coating of polyethylene on an unbonded surface of said carrier layer.

4. In a method for the manufacture of heat-sealable, laminated material, said method of the type including the steps of coating a carrier material web with an outside layer of slot-extruded polyethylene, subsequently laminating an aluminum foil web and the carrier material web with an extruded binder layer of polyethylene by bringing together the carrier web and the aluminum foil web between co-operating pressure cylinders, the improvement comprising the steps of bringing together between the pressure cylinders said extruded binder layer, said carrier layer, said aluminum foil and a coextruded blown web, one side of said coextruded blown web, facing toward the pressure cylinder, presenting a polyethylene layer and the other side of said coextruded blown web, facing toward the aluminum foil web, presenting a coating of ethylene acrylic acid, while providing the extruded binder layer of polyethylene with a heat content so that, concurrently, the binder layer attaches itself to the carrier web and to the aluminum foil web and the ethylene acrylic acid coating is heated to a temperature exceeding 93° C. by thermal energy conducted from the binder layer through the aluminum foil web to the ethylene acrylic acid coating, whereby the ethylene acrylic acid layer is attached to the aluminum foil web in a mechanically strong laminated union.

5. A method of manufacturing a laminated web material for packaging food, comprising the steps of providing a substrate having a first layer thermoplastic synthetic resin material coated on an outside surface of the substrate, supplying a layer of aluminum foil onto an inner surface of the substrate while injecting a first film of melted synthetic resin material between the substrate and the aluminum foil, supplying a thermoplastic synthetic resin second film onto the other, inner surface of the aluminum foil and pressing together said substrate, said first film of melted synthetic resin material, said aluminum foil, and said synthetic resin second film with a pair of rollers, so that, concurrently, said first film of melted synthetic resin material bonds said aluminum foil to said substrate and heat from said first film of melted synthetic resin material causes said synthetic resin second film to bond to the inner surface of said aluminum foil.

6. The method of claim 5, wherein said second film of synthetic resin film which is supplied to the inner surface of said aluminum foil is multilayered and includes a second film layer of synthetic resin material arranged so as to be placed in contact with said aluminum foil, said second film layer having a softening temperature lower than a softening temperature of said first film.

7. A method of making a laminated web material comprising:
    coextruding a blown polyethylene layer and an ethylene acrylic acid layer to form a coextruded film;
    slot extending a plastic film;
    coating a paper carrier layer with polyethylene;
    bringing together said coextruded film, said plastic film and said polyethylene coated carrier layer with an aluminum foil in superimposed relation, said plastic film being maintained at an elevated temperature, said aluminum foil being arranged between said coextruded film and said plastic film and said carrier layer on the opposite side of said plastic film from said aluminum foil to form a composite web; and
    compressing said composite web between pressure rolls so that said ethylene acrylic acid layer and said heated plastic film concurrently bond said composite web together to form a cohesive laminate.

8. The method according to claim 7 including cooling said web during said compressing step.

9. The method according to claim 7 wherein the polyethylene coating is on the exterior of said composite web.

* * * * *